US010173925B2

(12) United States Patent
Baumann et al.

(10) Patent No.: US 10,173,925 B2
(45) Date of Patent: Jan. 8, 2019

(54) SYNTHETIC POLYMER RHEOLOGY MODIFIER AND WATER RETENTION AGENT REPLACEMENT FOR CELLULOSE ETHER IN CEMENT COMPOSITIONS

(71) Applicants: Dow Global Technologies LLC, Midland, MI (US); Rohm and Haas Company, Philadelphia, PA (US)

(72) Inventors: Robert Baumann, Rueschlikon (CH); Adam W. Freeman, Chalfont, PA (US); Philip M. Imbesi, Gilbertsville, PA (US); Marc Schmitz, Verden/Aller (DE); Hongwei Shen, Holmdel, NJ (US); Wei-Wen Tsai, Horsham, PA (US); Sipei Zhang, Royersford, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 58 days.

(21) Appl. No.: 15/129,271

(22) PCT Filed: Mar. 27, 2015

(86) PCT No.: PCT/US2015/023039
§ 371 (c)(1),
(2) Date: Sep. 26, 2016

(87) PCT Pub. No.: WO2015/153349
PCT Pub. Date: Oct. 8, 2015

(65) Prior Publication Data
US 2017/0174567 A1 Jun. 22, 2017

Related U.S. Application Data

(60) Provisional application No. 61/972,812, filed on Mar. 31, 2014.

(51) Int. Cl.
| | | |
|---|---|---|
| C08F 222/00 | (2006.01) |
| C08F 216/12 | (2006.01) |
| C08F 220/10 | (2006.01) |
| C04B 16/10 | (2006.01) |
| C08F 290/06 | (2006.01) |
| C08F 299/00 | (2006.01) |
| C04B 24/26 | (2006.01) |
| C04B 40/00 | (2006.01) |
| C08F 222/10 | (2006.01) |
| C08F 216/14 | (2006.01) |
| C04B 103/00 | (2006.01) |
| C04B 103/46 | (2006.01) |

(52) U.S. Cl.
CPC .......... C04B 16/10 (2013.01); C04B 24/2647 (2013.01); C04B 40/0039 (2013.01); C08F 290/06 (2013.01); C08F 290/062 (2013.01); C08F 299/00 (2013.01); C04B 2103/0045 (2013.01); C04B 2103/0079 (2013.01); C04B 2103/46 (2013.01); C08F 222/1006 (2013.01); C08F 2216/1425 (2013.01); C08F 2216/1433 (2013.01)

(58) Field of Classification Search
CPC .... C08F 216/12; C08F 220/10; C08F 222/00; C08F 2216/1433; C08F 2216/1425
See application file for complete search history.

(56) References Cited

U.S. PATENT DOCUMENTS

| | | | |
|---|---|---|---|
| 5,470,383 A | 11/1995 | Schermann et al. | |
| 5,739,210 A * | 4/1998 | Scranton ................ | A61K 47/34 525/279 |
| 6,231,650 B1 | 5/2001 | Mallow et al. | |
| 6,384,111 B1 | 5/2002 | Kistenmacher et al. | |
| 7,576,040 B2 | 8/2009 | Lewis et al. | |
| 7,855,260 B2 | 12/2010 | Bichler et al. | |
| 2004/0260050 A1* | 12/2004 | Munnelly ............. | B41C 1/1008 528/176 |
| 2006/0032409 A1* | 2/2006 | Okazawa ............ | C04B 40/0039 106/810 |
| 2010/0087569 A1 | 4/2010 | Friedrich et al. | |
| 2010/0130641 A1* | 5/2010 | Findlay .................... | C08F 2/38 523/205 |
| 2010/0298499 A1* | 11/2010 | Goto ........................ | C08F 2/38 525/192 |
| 2012/0031813 A1* | 2/2012 | Schaefer .............. | B01D 17/047 208/188 |
| 2012/0264655 A1 | 10/2012 | Fitch et al. | |
| 2013/0095054 A1* | 4/2013 | Li ............................ | A61K 8/91 424/61 |

FOREIGN PATENT DOCUMENTS

| | | |
|---|---|---|
| CN | 102617811 A | 8/2012 |
| CN | 102807653 A | 12/2012 |
| CN | 102875047 A | 1/2013 |
| CN | 102875051 A | 1/2013 |
| CN | 102875746 A | 1/2013 |
| CN | 102887664 A | 1/2013 |
| CN | 102910855 A | 2/2013 |

(Continued)

OTHER PUBLICATIONS

JP 2004-346211 A (Dec. 9, 2004) Sogabe et al. Machine translation.*

*Primary Examiner* — Rip A Lee

(57) ABSTRACT

The present invention provides substantially nonionic brush polymers having pendant polyether groups, preferably poly(alkylene glycol) groups, which polymers are useful as synthetic polymer substitutes for cellulose ethers in mortars and hydraulic binders. The brush polymers are preferably crosslinked, such as with ethylene glycol di(meth)acrylates.

7 Claims, No Drawings

(56) References Cited

FOREIGN PATENT DOCUMENTS

| | | | |
|---|---|---|---|
| CN | 102911324 A | 2/2013 | |
| CN | 102964533 A | 3/2013 | |
| EP | 2523928 A1 | 11/2012 | |
| JP | 2004-346211 A * | 12/2004 | ............ C08F 299/00 |
| JP | 2013139351 A | 7/2013 | |
| KR | 20090090901 | 8/2009 | |
| WO | 2013134208 A1 | 9/2013 | |

* cited by examiner

SYNTHETIC POLYMER RHEOLOGY MODIFIER AND WATER RETENTION AGENT REPLACEMENT FOR CELLULOSE ETHER IN CEMENT COMPOSITIONS

The present invention relates to synthetic polymer replacements for use as replacements for cellulose ethers in cement admixture and dry mix compositions. More particularly, it relates to nonionic and substantially nonionic vinyl or acrylic brush polymers having pendant or side chain polyether groups, preferably, alkoxy poly(alkylene glycol) groups, and having a weight average molecular weight of from 10,000 to 50,000,000, or, preferably, 100,000 or more, as well as to methods of making them. Finally, it relates to methods of using the compositions in cement or concrete admixtures or dry mix compositions.

Cellulose ethers are well known as viscosity modifying agent (VMAs) additives for concrete and mortar production. They are added in very small amounts compared to the inorganic ingredients such as cement, fly ash, limestone powder, sand and gravel. However, cellulose ethers are formed from plant sources, e.g. pulp, by a very expensive multistep process; and, at present, the cost of a single manufacturing line used for making cellulose ethers ranges well into the hundreds of million dollars.

In use, cellulose ethers are formulated into cement based tile adhesives (CBTA) or dry mixes therefor to provide thickening and water retention after the introduction of water to the dry mix. Water retention enables wet application of mortar to an absorbing substrate, such as, for example, stone, stone structures, concrete brick or clay brick walls and properly set before the mortar would dry out. In addition, the thickening provided by a cellulose ether relies on its nature as a stiff polymer chain, including its high radius of gyration (Rg) and high persistence length (PL). Such thickening avoids flocculation or adsorption of the thickener onto alkaline particles in a cement or mortar; this phenomenon can be seen in the fact that cellulose ether polymers associate loosely with one another and retain water between them. Unlike water reducers and charged thickeners, cellulose ethers do not ball up in use but stay loosely coiled. The thickening and water retention provided by a cellulose ether is dosage dependent; and this enables shear thinning and so viscosity of compositions containing cellulose ethers is highly controllable in use. In short, this thickening and water retention goes a long way to explaining the popularity of cellulose ethers.

Unfortunately, the properties of cellulose ether cannot be obtained from any known synthetic polymer, and especially not one having more than a very small amount ($>1 \times 10^{-4}$ mol/g) of ionic charges per gram of polymer, e.g. not from carboxymethyl cellulose and polyether carboxylate water reducers. See, for example, Bülichen et al., "Working Mechanism of Methyl Hydroxyethyl Cellulose As Water Retention Agent", *Cement and Concrete Research* 42 (2012), 953-959, giving an anionicity of hydroxyethyl methyl cellulose (HEMC) as 6 Coulomb/g (or $6.02 \times 10^{-5}$ moles of anionic groups/per g). So, other polymers useful in mortars and cements, like polyether carboxylate water reducers have anionicity typically in the range of $0.4$-$3.4 \times 10^{-3}$ mol anionic groups/g polymer (A. Zingg et al, "Interaction of polycarboxylate-based superplastisizers with cements containing different $C_3A$ amounts", *Cement and Concrete Composites* 31 (2009), 153-162).

Ion or ionizable group containing polymers thicken by adsorbing the inorganic particles in a cement or mortar; such thickening cannot be controlled by shear thinning and is dosage dependent on the amount of polymer thickener in the composition.

U.S. Pat. No. 7,855,260B2, to Bichler et al., discloses copolymer additives for hydraulic binders that provide improved slump retention and workability. The polymers are superplastisizers that comprise an addition polymer backbone and polyether, e.g. polyethylene glycol, side chains. The backbone of the polymer contains a significant amount of carboxylic acid groups and or sulfuric acid groups; these groups ensure that the polymer gets adsorbed on the surface of alkaline or charged cement or gypsum particles. Such polymers ball up in use and so cannot provide the shear thinning or thickening that is at all independent of dosage.

The present inventors have endeavored to solve the problem of providing a replacement material for cellulose ethers for use in cement and dry mix compositions that gives similar mortar or cement properties to cellulose ethers but that does not require the huge capital expense of the plant or equipment to manufacture cellulose ethers.

STATEMENT OF THE INVENTION

1. In accordance with the present invention, compositions comprise hydrophilic substantially nonionic vinyl or acrylic brush polymers having pendant polyether groups, preferably, alkoxy poly(alkylene glycol) groups, and having a weight average molecular weight of from 10,000 to 50,000,000, or, preferably, 100,000 or more, or, more preferably, 250,000 or more, or, even more preferably, 2,500,000 or more.

2. The composition of 1, above, which comprise the polymerization product of a) from 70 to 100 wt. %, or, preferably, from 95 to 99.98 wt. %, or, more preferably, from 98 to 99.99 wt. %, based on the total weight of the monomers used to make the polymer, of one or more macromonomer having a pendant polyether group, such as polyethylene glycol (meth)acrylates, alkoxy polyethylene glycol (meth)acrylates, hydrophobic $C_{12}$ to $C_{25}$ alkoxy poly(alkylene glycol)s, and, preferably, polyethylene glycol (meth)acrylates and methoxy polyethylene glycol (meth)acrylates and b) as the remainder of the monomers used to make the polymer, one or more monomer chosen from lower alkyl ($C_1$ to $C_4$) alkyl (meth)acrylates, preferably, methyl methacrylate, and ethyl acrylate; hydroxyalkyl (meth)acrylates, preferably, hydroxyethyl methacrylate; diethylenically unsaturated crosslinker monomers, such as polyethylene glycol di(meth)acrylates, ethyleneglycol-dimethacrylate, ethylene glycol diacrylate, allyl acrylate or allyl methacrylate; and their combination.

3. The compositions of 1 or 2, above, wherein the substantially nonionic brush polymers contain pendant polyether groups chosen from polyalkylene glycols, such as polyethylene glycol, polypropylene glycol, polybutylene glycols or copolyethers of two of more thereof; alkoxy poly(alkylene glycol)s, such as methoxy poly(alkylene glycol)s, ethoxy poly(alkylene glycol)s and their combination.

4. The compositions of any of 1, 2 or 3, above, wherein the hydrophilic substantially nonionic brush polymers contain as pendant polyether groups a combination of two or more of polyalkylene glycols, alkoxy poly(alkylene glycol)s and hydrophobic $C_{12}$ to $C_{25}$ alkoxy poly(alkylene glycol)s.

5. The compositions of any of 1, 2, 3 or 4, above, wherein the hydrophilic substantially nonionic brush polymers containing pendant polyether groups have poly(alkylene glycol) side chains having from 5 to 50 ether or alkylene glycol units or, preferably, from 7 to 15 alkylene glycol units.

6. The compositions of any of 1, 2, 3, 4 or 5, above, wherein the hydrophilic substantially nonionic brush polymers of the present invention comprise the copolymerization product of a) a macromonomers chosen from polyethylene glycol (meth)acrylate (PEGMA) methoxypoly(ethylene glycol) (meth)acrylate (MPEGMA), or their mixture, preferably, such PEGMA and MPEGMA monomers having from 5 to 50 ethylene glycol units and, more preferably, from 7 to 15 ethylene glycol units.

7. The compositions of any of 1, 2, 3, 4, 5, or 6, above, further comprising a cellulose ether.

8. In another aspect of the present invention, methods of making the hydrophilic substantially nonionic brush polymers of the present invention of any of 1, 2, 3, 4, 5, 6, or 7, above, comprising polymerizing one or more addition polymerizable macromonomer having a pendant polyether group in the presence of an initiator.

9. The methods of as in 8, above, further comprising drying the hydrophilic substantially nonionic brush polymer, preferably, by spray drying, to form a powder composition.

As used herein, the phrase "aqueous" includes water and mixtures composed substantially of water and water-miscible solvents, preferably, such mixtures having more than 50 wt. % water, based on the total weight of water and any water-miscible solvents.

As used herein, the phrase "based on total solids" refers to weight amounts of any given ingredient in comparison to the total weight amount of all of the non-volatile ingredients in the aqueous composition, including synthetic polymers or many kinds, natural polymers, acids, defoamers, hydraulic cement, fillers, other inorganic materials, and other non-volatile additives. Water, ammonia and volatile solvents are not considered solids.

As used herein, the phrase "nonionic" with respect to brush polymers means that no monomer that was used to make the polymer has an anionic or cationic charge at a pH of from 1 to 14.

As used herein, the term "acrylic or vinyl polymer" refers to addition polymers of α,β-ethylenically unsaturated monomers, such as, for example, methoxypolyethylene glycol (meth)acrylate (MPEGMA) or polyethylene glycol (meth) acrylate (PEGMA) and allyl polyethylene glycol (APEG).

As used herein, the term "based on the total weight of monomers" refers to the amount of a thing compared to the total weight of addition monomers, such as, for example, vinyl monomers.

As used herein, the term "dry mix" refers to a dry composition that is free of added water and which contains unreacted inorganic powder, e.g. Portland cement powder, gypsum powder or pozzolanic powder, that would form a hydraulic cement or plaster or which would cure when wet. A dry mix may comprise dry organic components, like substantially nonionic brush polymers containing pendant polyether groups, cellulose ethers, polycarboxylate ethers, or water redispersible polymer powders (RDP).

As used herein, the term "pendant" group refers to a side chain of a polymer or a group that is covalently linked to the backbone of a polymer which is not an endgroup.

As used herein, unless otherwise indicated, the phrase "polymer" includes both homopolymers and copolymers from two or more than two differing monomers, as well as segmented and block copolymers.

As used herein, the term "substantially nonionic" means a polymer composition that at a pH of from 1 to 14 contains less than $10 \times 10^{-5}$ mol of anionically or cationically charged monomers or polymer repeat units e.g. a saccharide unit in a cellulosic polymer or a monomer polymerization residue in an addition polymer, per gram of polymer, based on the total solids in the polymer, or, preferably, $5 \times 10^{-5}$ mol/g polymer or less. Such polymers are made by polymerizing a monomer mixture containing no anionically or cationically charged monomers.

As used herein, unless otherwise indicated, the term "weight average molecular weight" is reported as either absolute or relative molecular weight (MW). Absolute MW was determined by gel permeation chromatography (GPC) in a column chromatography process further using a differential reflective index detector, Wyatt's Optilab rEX™ (Wyatt Technology, Santa Barbara, Calif.), and a multiple angle light scattering (MALS) detector, Wyatt's HELEOS II (Wyatt Technology). The polymer separation via GPC was performed using two TSKgel GMPW columns packed with 17-micron hydrophilic polymethacrylate beads in a 0.05 wt % sodium azide aqueous mobile phase at a flow rate of 0.5 mL/min with a controlled temperature of 28° C. A specific refractive index increment of 0.133 mL/g was used for MW calculation, and the absolute molecular weight and the radius of gyration (Rg) of each eluted polymer fraction was obtained from 1st order Zimm curve fitting, as disclosed in Wyatt, P. J., "Light Scattering and Absolute Characterization of Macromolecules", *Anal. Claim. Acta*, 272, p. 1-40, 1993. Reported is the weight average MW determined from all eluted polymer fractions from the GPC. Relative MW was determined using an Agilent 1100 GPC system (Agilent Technologies, Lexington, Mass.) equipped with a differential reflective index detector set at a temperature of 40° C. Two columns in series at 40° C., one a TSKgel G2500PWXL with 7 μm hydrophilic polymethacrylate beads and the other a TSKgel GMPWXL with 13 μm hydrophilic polymethacrylate beads, were used for polymer separation. As the aqueous mobile phase, a 20 mM phosphate buffer aqueous composition at a pH adjusted to 7.0 using NaOH was used for separation with a flow rate of 1 mL/min. MW averages were determined using Varian Cirrus GPC/SEC Software Version 3.3 (Varian, Inc., Palo Alto, Calif.). Polyacrylic acid standards from American Polymer Standards (Mentor, Ohio) were used to generate a calibration curve. In determining Relative MW, the calibration curve was used for subsequent (Relative) MW calculation.

As used herein, the term Rg or Radius of Gyration is determined from a 1st order Zimm curve fitting from the Absolute MW measurement of a given polymer using GPC-MALS.

As used herein, the term "wt. %" or "wt. percent" means weight percent based on solids.

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acrylate" encompasses, in the alternative, methacrylate, or acrylate, or mixtures thereof.

The endpoints of all ranges directed to the same component or property are inclusive of the endpoint and independently combinable. Thus, for example, a disclosed range of a weight average molecular weight of from 10,000 to 50,000,000, or, preferably, 100,000 or more, or, more preferably, 250,000 or more, or, even more preferably, 2,500,000 or more means any or all of such molecular weights ranging from 10,000 to 100,000, from 10,000 to 250,000, from 10,000 to 2,500,000, from 10,000 to 50,000,000, preferably, from 100,000 to 250,000, preferably, from 100,000 to 2,500,000, preferably, from 100,000 to 50,000,000, more preferably, from 250,000 to 1,500,000, more preferably, from 250,000 to 50,000,000, and even more preferably, from 2,500,000 to 50,000,000.

Unless otherwise indicated, conditions of temperature and pressure are room temperature and standard pressure, also referred to as "ambient conditions". The aqueous binder compositions may be dried under conditions other than ambient conditions.

In accordance with the present invention, the present inventors have discovered a synthetic substantially nonionic brush polymer material giving similar mortar properties that can be made, for example, via conventional aqueous emulsion, suspension or solution polymerization. The substantially nonionic brush polymers of the present invention thicken in cement admixtures and mortars without the undesirable cement setting retardation that is sometimes observed with cellulose ethers. The PL and Rg of the synthetic brush polymers of the present invention are similar to the PL and the Rg of cellulose ethers. The substantially nonionic pendant polyether group containing brush polymers of the present invention have substantially no ionic charge so their adsorption on a cement or hydraulic binder particle surface is minimized. Thus, the brush polymers of the present invention interact with a cement or alkaline particle surface in the same way as does a cellulose ether. Further, the pendant polyether groups on the synthetic polymer chains of the present invention minimize the rotation of the polymer backbone. This helps increase the radius of gyration (Rg) of the polymer and thus the water retention of the synthetic polymers. In addition, the high persistence length (PL) and polymer chain stiffness of such polymers prevents them from balling up in use, thereby improving shear thinning and thickening dependent of dosage. The polymers of the present invention thus perform like a cellulose ether in a cement admixture, a mortar, such as a CTBA, or in applications for dry mix compositions wherein they are wetted and applied to a substrate. In practice, aqueous solutions of the synthetic polymers of the present invention have high solution viscosity and exhibit effective water retention without a strong cement setting retardation.

The substantially nonionic brush polymers of the present invention have a high persistence length (PL) of 5 nm or more, preferably, 7 nm or more, and a high radius of gyration (Rg) of 50 nm or more, preferably, 100 nm or more.

Nonionic brush polymers having pendant polyether groups as in the present invention may be synthesized via conventional aqueous free radical polymerization of a macromonomer having a pendant polyether group in the presence of a thermal initiator, e.g. a persulfate or peracid, or a redox initiator, e.g. an organic peroxide and a bilsulfite. Such polymerization may be a shot polymerization wherein all of the monomer is present in the reactor when polymerization is initiated.

Preferably, to insure the highest molecular weight brush polymer product, polymerization is conducted in aqueous solution with a thermal initiator.

Preferably, the thermal initiator is a persulfate, or a peracid.

Preferably, to insure the highest molecular weight brush polymer product, polymerization is conducted in aqueous solution at a temperature of 75° C. or less, or, more preferably, 71° C. or less.

More preferably, to insure the highest molecular weight brush polymer product, polymerization is conducted in aqueous solution with a thermal initiator, at a temperature of 75° C. or less, or, more preferably, 72° C. or less.

Most preferably, to insure the highest molecular weight brush polymer product, polymerization is conducted in aqueous solution with a thermal initiator, at a concentration of 0.05 wt. % to 1 wt. %, based on the total weight of monomers (monomer solids) used to make the polymer, or, even more preferably, 0.08 wt. % or more.

In addition, nonionic brush polymers may be made via organic solvent solution polymerization of monomer in the presence of each of i) a grafting substrate containing one, two or more than two initiating groups, such as, for example, a multi-functional initiator, like a polybromobenzyl molecule or a polybromoacetyl molecule, ii) a catalyst for polymerization starting from the grafting substrate, such as, for example, a metal bromide salt, such as CuBr, and iii) a solubilizing ligand for the catalyst, followed by removing the solvent. The nonionic brush polymers made using such methods have as many branches as the number of initiating groups on the grafting-from substrate. An example of such polymerization methods is disclosed in U.S. Pat. No. 7,803,873B2, to Wagman. Such polymerization methods may employ, for example, a commercially available 1,1,1-Tris (2-bromoisobutyrloxymethyl)ethane (Sigma Aldrich, St. Louis, Mo.), having three initiating sites, i.e. the number of halides in the multi-functional initiator, in a bromide protected initiation polymerization. The halide may be substituted for with a chloride and/or iodide.

Suitable grafting substrates may be made via condensation of a boronic acid, containing a pendant initiating group described above, with a polyhydroxyl compound in the presence of base.

Suitable catalysts for pairing with the grafting substrate for use in making the nonionic brush polymers of the present invention may be metal halides of metals commonly used as polymerization catalysts, such as copper, iron, manganese, silver, platinum, vanadium, nickel, chromium, palladium, or cobalt. Preferably, the catalyst is chosen from copper bromides and copper chlorides.

The solvent and unreacted monomer from the organic solvent polymer solution may be removed by vacuum distillation, preferably, by precipitation of the polymer into an incompatible solvent, followed by filtration.

Still further, nonionic brush polymers having two or more branches may be made via aqueous initiation polymerization of the macromonomer in the presence of a diethylenically unsaturated comonomer, such as allyl methacrylate or a (poly)glycol di(meth)acrylate.

The substantially nonionic brush polymers containing pendant polyether groups may be made from a) 70 to 100 wt. %, or, preferably, from 95 to 99.99 wt. %, or, more preferably, from 98 to 99.98 wt. %, based on the total weight of the monomers used to make the polymer, of one or more macromonomer having a pendant polyether group, preferably, polyethylene glycol (meth)acrylates, methoxy polyethylene glycol (meth)acrylates, alkoxy polyethylene glycol (meth)acrylates that contain a $C_{12}$ to $C_{25}$ alkoxy end group on the polyether chain, and mixtures thereof; and one or more monomers b).

The monomers b) used to make the polymer may comprise lower alkyl ($C_1$ to $C_4$) alkyl (meth)acrylates and hydroxyalkyl (meth)acrylates, preferably, methyl methacrylate and hydroxyethyl methacrylate.

The substantially nonionic brush polymers of the present invention are preferably crosslinked and are made from 0.01 to 5 wt. %, or, preferably, from 0.02 to 2 wt. % of one or more diethylenically unsaturated crosslinker monomers, such as (poly)glycol di(meth)acrylates, like (poly)ethylene glycol dimethacrylates or (poly)ethylene glycol diacrylates; allyl acrylate or allyl methacrylate; or their combination.

The substantially nonionic brush polymers of the present invention contain as pendant polyether groups polyethers chosen from polyalkylene glycols, such as polyethylene glycol, polypropylene glycol, polybutylene glycols or copolyethers of two of more thereof; alkoxy poly(alkylene glycol)s, such as methoxy poly(alkylene glycol)s, ethoxy poly(alkylene glycol)s; hydrophobic $C_{12}$ to $C_{25}$ alkoxy poly(alkylene glycol)s; and, preferably, a combination of two or more of the foregoing.

The substantially nonionic brush polymers containing pendant polyether groups have poly(alkylene glycol) side chains having from 5 to 50 ether or alkylene glycol units or, preferably, from 7 to 15 alkylene glycol units.

Suitable macromonomers for making the substantially nonionic brush polymers of the present invention may be any macromonomer having a poly(alkylene glycol) of from 5 to 50 ether or alkylene glycol units or, preferably, from 7 to 15 alkylene glycol units, such as a polyethylene glycol (meth)acrylate or its corresponding (meth)acrylamide having from 5 to 50 ethylene glycol units and, preferably, from 7 to 15 ethylene glycol units, polypropylene glycol (meth)acrylate or its corresponding (meth)acrylamide having from 5 to 50 propylene glycol units and, preferably, from 7 to 15 propylene glycol units, $C_{12}$ to $C_{25}$ alkoxy polyethylene glycol (meth)acrylates or their corresponding (meth)acrylamides having from 5 to 50 ethylene glycol units and, preferably, from 7 to 15 ethylene glycol units, $C_{12}$ to $C_{25}$ alkoxy polypropylene glycol (meth)acrylates or their corresponding (meth)acrylamides having from 5 to 50 propylene glycol units and, preferably, from 7 to 15 propylene glycol units, polybutylene glycol (meth)acrylate or its corresponding (meth)acrylamide having from 5 to 50 total alkylene glycol units and, preferably, from 7 to 15 total alkylene glycol units, polyethylene glycol-polypropylene glycol (meth)acrylate or its corresponding (meth)acrylamide having from 5 to 50 total alkylene glycol units and, preferably, from 7 to 15 total alkylene glycol units, polyethylene glycol-polybutylene glycol (meth)acrylate or its corresponding (meth)acrylamide having from 5 to 50 total alkylene glycol units and, preferably, from 7 to 15 total alkylene glycol units, polypropylene glycol-polybutylene glycol (meth)acrylate or its corresponding (meth)acrylamide having from 5 to 50 total alkylene glycol units and, preferably, from 7 to 15 total alkylene glycol units, polyethylene glycol-polypropylene glycolpolybutylene glycol (meth)acrylate or its corresponding (meth)acrylamide having from 5 to 50 total alkylene glycol units and, preferably, from 7 to 15 total alkylene glycol units, methoxypolyethylene glycol (meth)acrylate or its corresponding (meth)acrylamide having from 5 to 50 ethylene glycol units and, preferably, from 7 to 15 ethylene glycol units, methoxypolypropylene glycol (meth)acrylate or its corresponding (meth)acrylamide having from 5 to 50 propylene glycol units and, preferably, from 7 to 15 propylene glycol units, methoxypolybutylene glycol (meth)acrylate or its corresponding (meth)acrylamide having from 5 to 50 total alkylene glycol units and, preferably, from 7 to 15 total alkylene glycol units, methoxypolybutylene glycol mono(meth)acrylate or its corresponding (meth)acrylamide having from 5 to 50 total alkylene glycol units and, preferably, from 7 to 15 total alkylene glycol units, methoxypolyethylene glycol-polypropylene glycol (meth)acrylate or its corresponding (meth)acrylamide having from 5 to 50 total alkylene glycol units and, preferably, from 7 to 15 total alkylene glycol units, methoxypolyethylene glycol-polybutylene glycol (meth)acrylate or its corresponding (meth)acrylamide having from 5 to 50 total alkylene glycol units and, preferably, from 7 to 15 total alkylene glycol units, methoxypolypropylene glycol-polybutylene glycol (meth)acrylate or its corresponding (meth)acrylamide having from 5 to 50 total alkylene glycol units and, preferably, from 7 to 15 total alkylene glycol units, methoxypolyethylene glycol-polypropylene glycol-polybutylene glycol (meth)acrylate or its corresponding (meth)acrylamide having from 5 to 50 total alkylene glycol units and, preferably, from 7 to 15 total alkylene glycol units, ethoxypolyethylene glycol (meth)acrylate or its corresponding (meth)acrylamide having from 5 to 50 ethylene glycol units and, preferably, from 7 to 15 ethylene glycol units, polyethylene glycol (meth)allyl ether or monovinyl ether having from 5 to 50 ethylene glycol units and, preferably, from 7 to 15 ethylene glycol units, polypropylene glycol (meth)allyl ether or monovinyl ether having from 5 to 50 propylene glycol units and, preferably, from 7 to 15 propylene glycol units, polyethylene glycol-polypropylene glycol (meth)allyl ether or monovinyl ether having from 5 to 50 total alkylene glycol units and, preferably, from 7 to 15 total alkylene glycol units, polyethylene glycol-polybutylene glycol (meth)allyl ether or monovinyl ether having from 5 to 50 total alkylene glycol units and, preferably, from 7 to 15 total alkylene glycol units, polypropylene glycol-polybutylene glycol (meth)allyl ether or monovinyl ether having from 5 to 50 total alkylene glycol units and, preferably, from 7 to 15 total alkylene glycol units, methoxypolyethylene glycol (meth)allyl ether or monovinyl ether having from 5 to 50 ethylene glycol units and, preferably, from 7 to 15 ethylene glycol units, methoxypolypropylene glycol (meth)allyl ether or monovinyl ether having from 5 to 50 propylene glycol units and, preferably, from 7 to 15 propylene glycol units, and the corresponding monoesters, monoamides, diesters and diamides of itaconic or maleic acids, or mixtures of any of the foregoing. Preferably, the macromonomers used to make the substantially nonionic brush polymers of the present invention are methacrylate monomers, such as methoxypolyethylene glycol methacrylate (MPEGMA).

Preferably, the macromonomers used to make the substantially nonionic brush polymers of the present invention comprise polyethylene glycol (meth)acrylate (PEGMA) or methoxypoly(ethylene glycol) (meth)acrylate (MPEGMA), particular those PEGMA and MPEGMA monomers having from 5 to 50 ethylene glycol units and, preferably, from 7 to 15 ethylene glycol units.

The substantially nonionic brush polymers of the present invention may comprise a copolymer of a macromonomer and, a monomer b) from 0.1 to 35 wt. %, based on the total weight of monomers used to make the polymer, or, preferably, from 0.1 to 20 wt. %, or, more preferably, from 0.5 to 5 wt. % of a nonionic comonomer such as a hydroxyalkyl methacrylate, or a $C_1$ to $C_4$ alkyl (meth)acrylates.

The substantially nonionic brush polymers of the present invention may have a weight average molecular weight as high as 50,000,000 and as low as 10,000, preferably, 100,000 or more, or, more preferably, 250,000 or more, or, more preferably, 2,500,000 or more. Such polymers have a high polymer chain stiffness and a high persistence length (PL) relative to polymers having a similar molecular structure but a smaller concentration of pendant polyether groups.

Compositions of the substantially nonionic brush polymers containing pendant polyether groups of the present invention may comprise an aqueous liquid or a dry powder, such as a spray dried powder on an inorganic carrier, such as silica, talc, or clay, e.g. bentonite.

The compositions of the present invention, either aqueous or dry mixes, may comprise a combination of the substantially nonionic brush polymers containing pendant polyether groups and one or more polysaccharide thickeners, preferably, cellulose ethers. Such compositions may be in aqueous liquid or, preferably, dry form as powder or granules.

The amount of polysaccharide thickener in the compositions of the present invention may range from 0 to 98 wt. %, or, preferably, from 50 to 90 wt. %, based on the total solids of the polysaccharide thickener and the substantially nonionic brush polymers containing pendant polyether groups.

The polysaccharide thickeners may be chosen from methyl cellulose (MC); hydroxyalkyl celluloses, like hydroxyethyl cellulose (HEC); hydroxyalkyl-methyl-celluloses, such as, for example, hydroxyethyl cellulose (HEC), hydroxyethyl methyl cellulose (NEMC), hydroxypropyl methyl cellulose (HPMC), and ethyl hydroxyethyl cellulose (EHEC); starch ethers; gums, such as diutan gum or welan gum, and mixtures thereof. Preferably, the polysaccharide thickeners are methyl cellulose, hydroxylalkyl celluloses, and hydroxyalkyl methyl celluloses.

The compositions of the present invention may also comprise polycarboxylate ethers (PCEs), including any acrylic or vinyl comb polymer that has polyether or alkyl polyether side chains, preferably, alkoxy (poly)oxyalkylene side chains. Suitable alkoxy (poly)oxyalkylene functional side chains for the polycarboxylate ethers of the present invention can have from 1 to 500, preferably, 100 or less or 6 or more, or, more preferably, from 10 to 50 oxyalkylene groups. The alkoxy group of the side chain may have from 1 to 20 carbon atoms.

An example of a suitable polycarboxylate ether is that sold as Glenium™ 51 polymer (BASF, Leverkusen, Del.).

The compositions of the present invention can contain, in addition, conventional additives, such as, for example, cement setting accelerators and retarders, air entrainment agents or defoamers, shrinking agents and wetting agents; surfactants, particularly nonionic surfactants; spreading agents; mineral oil dust suppressing agents; biocides; plasticizers; organosilanes; anti-foaming agents such as dimethicones and emulsified poly(dimethicones), silicone oils and ethoxylated nonionics; and; coupling agents such as, epoxy silanes, vinyl silanes and hydrophobic silanes. If any additive comprises a liquid, it may be used in dry mix compositions by depositing it on a carrier, such as by co-spray drying the additive with from 10 to 90 wt. %, based on the total solids of the additive, of silica, talc or an anticaking additive such as bentonite.

The aqueous compositions may be used as additives in cement or mortar applications, such as, for example, in mortars and dry mixes for mortars useful in cement tile adhesive applications.

EXAMPLES

The following examples serve to illustrate the invention. Unless otherwise indicated, the preparations and test procedures are carried out at ambient conditions of temperature and pressure.

Synthesis Examples 1-17

Synthesis Process:

All polymers were synthesized in an aqueous solution shot polymerization process via free radical polymerization. Unless otherwise specified, 500 mL 4-neck round bottom reaction flask coupled with a thermo-couple, an overhead stirrer and a condenser was used for all polymer synthesis and a heating mantel was used to control reaction temperature. Unless stated otherwise, all chemicals used were from Sigma Aldrich (St. Louis, Mo.). During polymerization, after the temperature rose to an indicated target temperature, a controlled initial dosage of initiators or redox packages was added and the temperature was held constant for two hours. After the two-hour polymerization, a second dosage of initiators or redox packages was used to reduce the amount of residual monomers and the temperature was held constant for two hours. After the second two-hour reaction, the reactor was cooled down to near room temperature before taking the solution sample out of reactor for analysis and performance tests.

Example 1

A brush polymer was made via the Synthesis Process, above, wherein the reactants comprised 180 grams of de-ionized (DI) water and 10 grams of methoxypoly(ethylene glycol)$_{10.8}$ methacrylate (MPEGMA475) monomer all charged in the reaction flask. Target temperature was set at 70±1° C. The initial dosage was a redox initiator package including 1 gram of 0.1 wt. % ethylenediamine tetraacetate (DETA) solution, 1 gram of 0.1 wt. % ferrous sulfate solution, 2 grams of 0.5 wt. % of reducing agent Bruggolite™ FF6M disodium salt of 2-hydroxy-2-sulfinatoacetic acid and 2-hydroxy-2-sulfonatoacetic acid (FF6) (Bruggemann Chemical, Chadds Ford, Pa.) and 2 grams of 0.5 wt. % ammonium persulfate (APS) aqueous solution. The second initiator dosage included 2 grams of 0.5 wt. % of FF6 and 2 grams of 0.5 wt. % APS aqueous solution.

Example 2

A brush polymer was made via the Synthesis Process, above, wherein the reactants were 180 grams of de-ionized water and 10 grams of MPEGMA475 monomer all charged in the reaction flask. Target temperature was set at 88±1° C. The initial dosage of initiator was 2 grams of 0.5 wt. % APS aqueous solution. The second dosage of initiator included 1 gram of 0.5 wt. % APS aqueous solution.

Example 3

A brush polymer was made via the Synthesis Process, above, wherein the reactants were 189 grams of de-ionized water and 10.3 grams of MPEGMA475 monomer all charged in the reaction flask. Target temperature was set at 70±1° C. The initial dosage of initiator was 0.4 grams of 0.5 wt. % APS aqueous solution. The second dosage of initiator included 1.5 gram of 0.5 wt. % APS aqueous solution.

Example 4

A brush polymer was made via the Synthesis Process, above, wherein the reactants were 177 grams of de-ionized water and 20.2 grams of MPEGMA750 monomer with 50 wt. % active all charged in the reaction flask. Target temperature was set at 70±1° C. The initial dosage of initiator was 2 grams of 0.5 wt. % APS aqueous solution. The second dosage of initiator included 1.5 gram of 0.5 wt. % APS aqueous solution.

Example 5

A brush polymer was made via the Synthesis Process, above, wherein the reactants were 191 grams of de-ionized water, 1.4 grams of MPEGMA475 and 4.0 grams of poly (ethylene glycol)$_{8.2}$ methacrylate (PEGMA360) monomers all charged in the reaction flask. Temperature was set at 60±1° C. The initial dosage was a redox package including 1.8 gram of 0.1 wt. % DETA solution, 1.8 gram of 0.1 wt. % ferrous sulfate solution, 0.12 grams of 0.5 wt. % of reducing agent FF6, and 0.10 grams of 0.5 wt. % ammonium persulfate (APS) aqueous solution. The second dosage of initiator included 1.5 grams of 0.5 wt. % of FF6 and 1.5 grams of 0.5 wt. % APS aqueous solution.

Example 6

A brush polymer was made via the Synthesis Process, above, wherein the reactants were 173 grams of de-ionized water and 20 grams of MPEGMA475 monomer all charged in the reaction flask. Temperature was set at 70±1° C. The initial dosage of initiator was 4 grams of 0.5 wt. % APS aqueous solution. The second dosage of initiator included 1 gram of 0.5 wt. % APS aqueous solution.

Example 7

A brush polymer was made via the Synthesis Process, above, wherein the reactants were 185 grams of de-ionized water and 10 grams of MPEGMA475 monomer all charged in the reaction flask. Temperature was set at 70±1° C. The initial dosage of initiator was 0.3 grams of 0.5 wt. % APS aqueous solution. The second dosage of initiator included 1 gram of 0.5 wt. % APS aqueous solution.

Example 8

A brush polymer was made via the Synthesis Process, above, wherein the reactants were 187 grams of de-ionized water, 9.6 grams of MPEGMA475 monomer and 0.40 grams of 0.5 wt. % ethylene glycol dimethacrylate (EGDMA) in a solution of MPEGMA475 all charged in the reaction flask. Temperature was set at 50±1° C. The initial dosage of initiator was 0.4 gram of a 0.5 wt. % Vazo™ 56 2,2'-azobis (2-amidinopropane) dihydrochloride (Dupont, Wilmington, Del.) aqueous solution. The second dosage of initiator included 1 gram of a 0.5 wt. % Vazo™ 56 initiator aqueous solution.

Example 9

A brush polymer was made via the Synthesis Process, above, wherein the reactants were 187 grams of de-ionized water, 9.9 grams of MPEGMA475 and 0.26 gram of EGDMA monomers all charged in the reaction flask. Temperature was set at 70±1° C. The initial dosage of initiator was 0.37 grams of 0.5 wt. % APS aqueous solution. The second dosage of initiator included 1 gram of 0.5 wt. % APS aqueous solution.

Example 10

A brush polymer was made via the Synthesis Process, above, wherein the reactants were 177.3 grams of de-ionized water, 14.9 grams of MPEGMA475 and 0.19 gram of EGDMA monomers all charged in the reaction flask. Temperature was set at 70±1° C. The initial dosage of initiator was 0.5 grams of 0.5 wt. % APS aqueous solution. The second dosage of initiator included 1 gram of 0.5 wt. % APS aqueous solution.

Example 11

A brush polymer was made via the Synthesis Process, above, wherein the reactants were 188.6 grams of de-ionized water, 5 grams of MPEGMA475 and 5 gram of PEGMA360 monomers all charged in the reaction flask. Temperature was set at 70±1° C. The initial dosage of initiator was 0.4 grams of 0.5 wt. % APS aqueous solution. The second dosage of initiator included 1 gram of 0.5 wt. % APS aqueous solution.

Example 12

A brush polymer was made via the Synthesis Process, above, wherein the reactants were 178 grams of de-ionized water and 21 grams of methoxy(polyethlylene glycol)$_{17.05}$ methacrylate (MPEGMA750) monomer with 50 wt. % active all charged in the reaction flask. Temperature was set at 70±1° C. The initial dosage of initiator was 0.42 grams of 0.5 wt. % APS aqueous solution. The second dosage of initiator included 1.5 gram of 0.5 wt. % APS aqueous solution.

Example 13

A brush polymer was made via the Synthesis Process, above, wherein the reactants were 175 grams of de-ionized water and 20 grams of methoxypoly(ethylene glycol)$_{45.45}$ methacrylate (MPEGMA2000) monomer with 50 wt. % active were charged in the reaction flask. Temperature was set at 70±1° C. The initial dosage of initiator was 0.2 grams of 0.5 wt. % APS aqueous solution. The second dosage of initiator included 0.4 gram of 0.5 wt. % APS aqueous solution.

Example 14

A brush polymer was made via the Synthesis Process, above, except that a 1000 mL 4-neck round bottom flask was used, wherein in the process the reactants were 512.5 grams of de-ionized water and 29.5 grams of methoxypoly(ethylene glycol)$_{11.36}$ methacrylate (MPEGMA500) monomer all charged in the reaction flask. Temperature was set at 70±1° C. The initial dosage of initiator was 0.6 grams of 0.5 wt. % APS aqueous solution. The second dosage of initiator included 2 gram of 0.5 wt. % APS aqueous solution.

Example 15

A brush polymer was made via the Synthesis Process, above, wherein the reactants were 185 grams of de-ionized water, 0.6 gram of hydroxyethyl methacrylate (HEMA) and 9.4 grams of MPEGMA500 monomers all charged in the reaction flask. Temperature was set at 70±1° C. The initial dosage of initiator was 2 grams of 0.5 wt. % APS aqueous solution. The second dosage of initiator included 2 gram of 0.5 wt. % APS aqueous solution.

Example 16

A brush polymer was made in the same way as the polymer of Example 15, except that 1.5 gram of hydroxyethyl methacrylate (HEMA) and 8.6 grams of MPEGMA500 monomers were charged in the reaction flask.

Example 17

A brush polymer was made in the same way as in Example 15, except that 2.8 gram of HEMA and 7.2 grams of MPEGMA500 monomers were charged in the reaction flask.

The resulting polymers in synthesis Examples 1-17 were evaluated to determine their weight average molecular weight (GPC) and, viscosity, PL and Rg, as follows:

Persistence Length or (PL) and Radius of Gyration (Rg):

For a given polymer, the PL was determined based on the Kratky-Porod (KP) polymer chain model, by estimating from a non-linear least square curve fitting of a Rg (y axis) vs. an absolute MW (x axis) curve obtained by GPC including MALS using the following equation derived from the Kratky-Porod chain model (see T. Mourey, K. Le, T. Bryan, S. Zheng, G. Bennett *Polymer* 2005, 46, 9033-9042):

$$R_g^2 = L_p * M/3M_L - L_p^2 + 2L_p^3 * M_L/M - 2L_p^4 * M_L^2(1-e(-M/(L_p*M_L)))/M^2$$

In the above equation, e is a natural log base; * represents a multiplier operator; Lp is the persistence length (PL); M is the absolute MW; $M_L$ is the molar mass per unit contour length. Assuming that the polymer has a homogeneous composition, $M_L$ was obtained from the repeat unit structure for the given polymer. Finally, the reported Lp was taken from the best fit of the Rg (y-axis) vs. MW (x-axis) curve with fixed $M_L$ by minimizing the sum of the square of the $(\log(Rg_{measured}) - \log(Rg_{fitted}))$ on all data points from the Rg vs. MW curve.

TABLE 1

Analytical Data on Nonionic Brush Polymers

| Example | Description | Absolute Mw (kg/mol) | Degree of polymerization | Rg (nm) | Estimated PL (nm) |
|---|---|---|---|---|---|
| 1 | MPEGMA475 polymer | 770 | 1600 | 45 | 5.9 |
| 2 | MPEGMA475 polymer | 2800 | 5900 | 75 | 6.5 |
| 3 | MPEGMA475 polymer | 5700 | 12000 | 155 | 7.9 |
| 4 | MPEGMA750 polymer | 12300 | 16400 | 205 | 12.8 |
| 5 | MPEGMA475-co-PEGMA360 | 770 | 1900 | 45 | 5.0 |
| CE 1 | HPMC[1] control | 740 | 1900 | 130 | 12.6 |
| CE 2 | PEO polymer | 190 | 4300 | 40 | 1.3 |

[1]Methocel ™ F75M hydroxypropyl methyl cellulose ether (HPMC) (The Dow Chemical Co., Midland, MI).

As shown in Table 1, above, brush PEGMA polymers with a similar degree of polymerization as of hydroxypropyl methyl cellulose (HPMC) in Comparative Example CE1 have an acceptably high persistence length (>5 nm) and, by comparison, a much higher PL than the C—C—O backbone polyethylene oxide (PEO) polymers in Example CE2 that have a number of ~1 nm.

Solution Viscosity:

Viscosity and shear thinning behavior of a 1.5 wt. % polymer aqueous solution was measured at 25° C. on using an Anton Paar MCR 301 viscometer (Anton Paar USA, Ashland, Va.) equipped with a high-throughput automated system. Polymers were dissolved in the indicated concentrations with stirring until the solution became homogeneous in DI water. Viscosity data was collected at a shear range increasing from 0.1 to 400 Hz. Acceptable shear viscosity at 0.5 Hz is anything above 1000 cP, preferably, 2500 cP or higher. Acceptable shear viscosity at 5 Hz is anything above 300 cP, preferably, 500 cP or higher.

As shown in the Table 2, below, the polymers of the present invention gave room temperature shear viscosities as a 1.5 wt. % polymer aqueous solution comparable to cellulose ethers especially, the crosslinked polymers of Examples 9-10 which had a molecular weight well into the preferred range. The polymer of Example 8, although crosslinked, was made with a thermal bis-nitrile which is not a preferred thermal initiator; and resulted in a lower product brush polymer molecular weight. The Example 6 polymer had a very high molecular weight as a result of using a high 0.1 wt. % of a persulfate initiator in polymerization. The polymer of Example 11 comprised a particularly preferred combination of PEGMA and MPEGMA, each having from 7 to 11 ethylene glycol groups in the side chain of the macromonomer; and the polymer had a molecular weight similar to crosslinked brush polymers.

TABLE 2

Solution Viscosities

| Example | Shear viscosity at 0.5 Hz (cP) | Shear viscosity at 5.0 Hz (cP) | Comment | Relative MW |
|---|---|---|---|---|
| CE 1[1] | 10258 | 4269 | HPMC | 710 |
| 6 | 2265 | 388 | MPEGMA475 polymer | — |
| 7 | 43 | 35 | MPEGMA475 polymer | 2320 |
| 8 | 24 | 24 | MPEGMA475 polymer crosslinked | 2430 |
| 9 | 3067 | 618 | MPEGMA475 polymer crosslinked | — |
| 10 | 5865 | 912 | MPEGMA475 polymer crosslinked | — |
| 11 | 2135 | 514 | PEGMA360:MPEGMA475 copolymer | — |
| 12 | 15 | 15 | MPEGMA750 polymer | 1660 |
| 13 | 9 | 5 | MPEGMA2000 polymer | 1070 |
| 14 | 147 | 110 | MPEGMA500 polymer | 2240 |
| 15* | 16 | 15 | 94PEGMA500/6HEMA | 1870 |
| 16* | 14 | 14 | 85PEGMA500/15HEMA | 1630 |
| 17* | 17 | 13 | 72PEGMA500/28HEMA | 350 |

*Solution viscosities of Examples 15-17 were measured on a Rheometrics Fluids Spectrometer 2, described below;
[1]Methocel ™ F75M hydroxypropyl methyl cellulose ether (HPMC) (The Dow Chemical Co., Midland, MI).

The inventive polymers were further analyzed, as follows:

Dynamic Viscosity:

Measurements of aqueous polymer solutions having a concentration of 1.5 wt. % polymer were performed on a Rheometrics Fluids Spectrometer 2 (RFS-2) (Rheometrics, Inc., Piscataway N.J.) using the 50 mm diameter parallel plate fixture at 25° C. Strain sweeps were conducted to determine a linear viscoelastic regime. Because each Example gave different viscosities, various strain amplitudes were used to optimize the torque signal to stay within operation limits of the transducers and enable testing in the linear viscoelastic regime. Then, the samples were tested in a dynamic frequency sweep mode from 0.1 rad/s (radians/second) to 100 rad/s in eight equally spaced logarithmic increments per decade of frequency. The dynamic viscosity was recorded as a function of shear frequency and the value at selected frequencies is plotted in Table 3, below.

TABLE 3

Rheology of Polymers

| Example | dynamic viscosity at 0.1 rad/s (Pa s) | dynamic viscosity at 1 rad/s (Pa s) | dynamic viscosity at 10 rad/s (Pa s) |
|---|---|---|---|
| CE1[1] | 12.4 | 8.1 | 3.8 |
| 1 | 0.0036 | 0.0016 | 0.0013 |
| 2 | 0.0027 | 0.0024 | 0.0024 |
| 6 | 11.8 | 1.5 | 0.26 |
| 7 | 0.032 | 0.030 | 0.025 |
| 9 | 18.6 | 2.7 | 0.52 |
| 10 | 39.4 | 5.0 | 0.76 |
| 11 | 13.3 | 2.1 | 0.49 |
| 15 | 0.024 | 0.015 | 0.013 |

TABLE 3-continued

Rheology of Polymers

| Example | dynamic viscosity at 0.1 rad/s (Pa s) | dynamic viscosity at 1 rad/s (Pa s) | dynamic viscosity at 10 rad/s (Pa s) |
|---|---|---|---|
| 16 | 0.021 | 0.013 | 0.011 |
| 17 | 0.027 | 0.013 | 0.0096 |

[1]Methocel™ F75M cellulose ether (HPMC, Dow).

As shown in Table 3, above, the polymers of the present invention in Examples 6 and 9, 10 and 11, within the most preferred range of weight average molecular weight exhibit both thickening and shear thinning like that of a cellulose ether, Methocel™ F75M hydroxypropyl methyl cellulose ether (HPMC) of Example CE1.

Application Testing:

In a CBTA mortar formulation from Table 4, below, the polymers of the present invention gave a mortar consistency and water retention similar to that of Methocel™ F75M cellulose ether. And cement setting rate is significantly less reduced. Performance was tested in this mortar formulation for water retention capability (according to DIN 18555-7: 1987-11 (1987) Deutsches Institut für Normung, Beuth Verlag GmbH, Berlin, Del.) and setting behaviour (according to DIN EN 196-3:2009-2, 2009, Beuth Verlag GmbH), wherein one inserts a pin into mortar, measuring the beginning ("begin") when insertion into the mortar becomes difficult, and measuring the ending ("end") as when the pin cannot be inserted. Results are shown in Table 5, below.

Acceptable water retention % is 90% or higher, preferably, 93% or higher.

TABLE 4

Mortar Formulation

| Material | Identity | Part (wt. %) |
|---|---|---|
| Cement | OPC CEM I 42,5R Holcim PUR4, Hamburg, DE | 30.0 |
| Sand I | Quarzsand F32 (Quarzwerke Frechen, Frechen, DE) | 34.8 |
| Sand II | Quarzsand F36 (Quarzwerke Frechen, Frechen, DE) | 34.8 |
| Polymer | Indicated in Table 5 | 0.4 |

TABLE 5

Mortar Performance

| Example | C3[2] | CE1[1] | 6 | 7 | 8 | 9 | 10 | 11 | 14 | 15 | 16 | 17 |
|---|---|---|---|---|---|---|---|---|---|---|---|---|
| water retention (%) | 73.3 | 98.1 | 92.2 | 91.6 | 86.9 | 93.3 | 92.7 | 94.0 | 97.3 | 93.2 | 93.2 | 92.0 |
| setting (min) begin | 223 | 614 | 364 | 370 | 394 | 340 | 365 | 311 | 429 | | | |
| End | 488 | 814 | 525 | 540 | 538 | 496 | 467 | 429 | 567 | | | |
| duration | 265 | 200 | 161 | 170 | 144 | 156 | 102 | 118 | 138 | | | |

[1]Methocel™ F75M HPMC cellulose ether, (Dow, Midland, MI);
[2]No thickener additive The performance of the inventive Examples in mortar in Table 5, above, shows that the nonionic brush polymers of the present invention in Examples 6-7, 9-11 and 14-17 thicken nearly as efficiently as the cellulose ether and do so acceptably well. The Example 8 polymer was made with a non-preferred initiator and had a lower product brush polymer molecular weight compared to the same polymer made with the same amount of preferred peracids. Table 5 also shows that in comparison to the cellulose ether of Example CE1, the inventive polymers of Examples 6-11 and 14 did not retard setting as much as did the cellulose ether.

We claim:

1. A composition comprising a hydrophilic substantially nonionic vinyl or acrylic brush polymer having pendant polyether groups and having a weight average molecular weight of from 100,000 to 50,000,000, wherein the brush polymer contains less than $10 \times 10^{-5}$ mol of anionically or cationically charged monomer or polymer repeat units per gram of polymer based on the total solids of the polymer at a pH of from 1 to 14 and wherein the brush polymer consists of the polymerization product of (a) from 70 to 100 wt. %, based on the total weight of the monomers used to make the polymer, of a macromonomer having a pendant polyether group, the macromonomer being chosen from a polyethylene glycol (meth)acrylate, a methoxy polyethylene glycol (meth)acrylate, a hydrophobic $C_{12}$ to $C_{25}$ alkoxy poly(alkylene glycol) (meth)acrylate, or combinations thereof, (b) lower alkyl ($C_1$ to $C_4$) alkyl (meth)acrylates, hydroxyalkyl (meth)acrylates, or combinations thereof, and (c) optionally, from 0.01 to 5 wt % of one or more diethylenically unsaturated crosslinker monomers.

2. The composition as claimed in claim 1, wherein the brush polymer has a weight average molecular weight of 250,000 to 50,000,000.

3. The composition as claimed in claim 1, wherein the substantially nonionic brush polymer is crosslinked.

4. The composition as claimed in claim 1, wherein the substantially nonionic brush polymer contains as pendant polyether groups poly(alkylene glycol) side chains having from 5 to 50 ether or alkylene glycol units.

5. The composition as claimed in claim 4, wherein the pendant polyether groups are poly(alkylene glycol) side chains having from 7 to 15 ether or alkylene glycol units.

6. The composition as claimed in claim 1, wherein the macromonomer is chosen from polyethylene glycol (meth) acrylate (PEGMA) or methoxypoly(ethylene glycol) (meth) acrylate (MPEGMA).

7. The composition as claimed in claim 1, further comprising a cellulose ether.

* * * * *